No. 624,213. Patented May 2, 1899.
C. N. HOLDEN.
RAISIN SEEDER.
(Application filed Dec. 7, 1898.)
(No Model.)
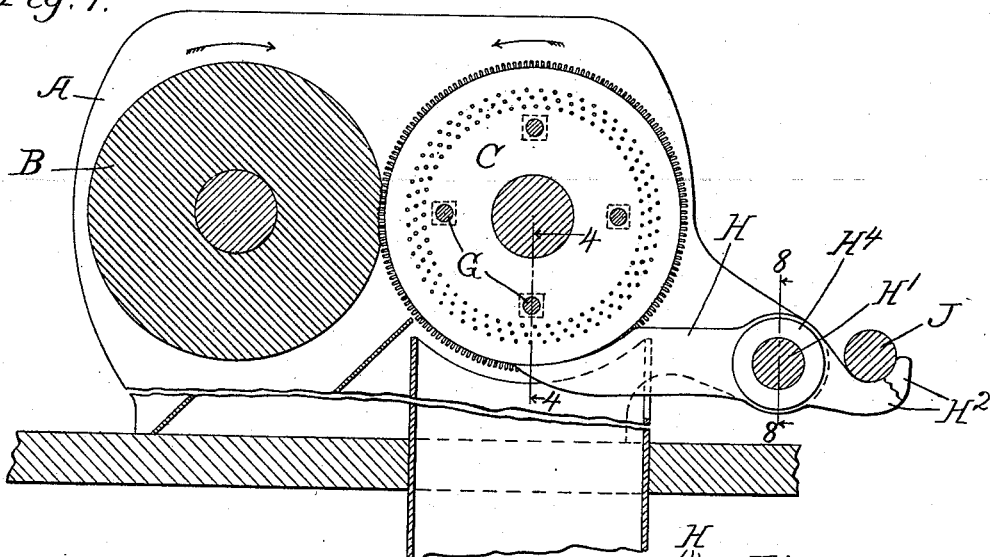
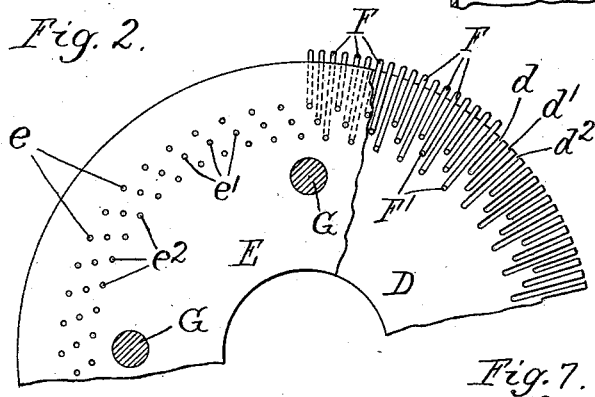
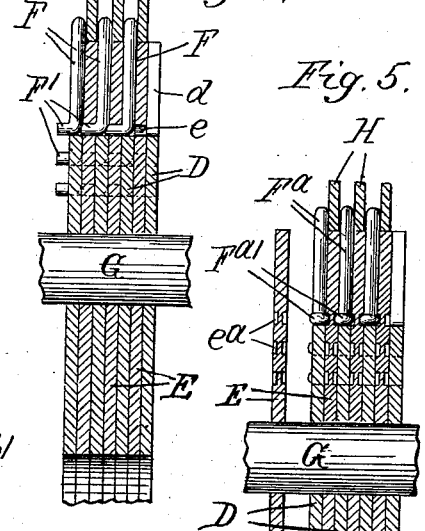
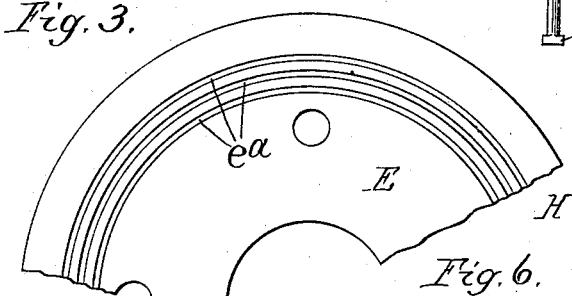
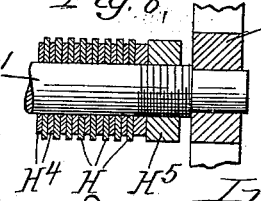
Witnesses. Inventor.
Edward T. Wray. Charles N. Holden
Jean Elliott by Burton and Burton
his attys.
THE NORRIS PETERS CO., PHOTO-LITHO., WASHINGTON, D. C.

UNITED STATES PATENT OFFICE.

CHARLES N. HOLDEN, OF CHICAGO, ILLINOIS.

RAISIN-SEEDER.

SPECIFICATION forming part of Letters Patent No. 624,213, dated May 2, 1899.

Application filed December 7, 1898. Serial No. 698,506. (No model.)

*To all whom it may concern:*

Be it known that I, CHARLES N. HOLDEN, a citizen of the United States, residing at Chicago, county of Cook, and State of Illinois, have invented certain new and useful Improvements in a Perforator for Raisin-Seeders, which are fully set forth in the following specification, reference being had to the accompanying drawings, forming a part thereof.

The purpose of this invention is to provide an improved device to be employed in machines for seeding raisins and similar purposes for the purpose of perforating the fruit and expelling the seed.

In the drawings, Figure 1 is a section transverse with respect to the rollers of a raisin-seeding machine which in its general structure is of a familiar type and which as to the perforating and seed-ejecting device embodies my invention. Fig. 2 is a detail side elevation showing a portion of two consecutive disks of the perforating-cylinder of my improved machine, a portion of the teeth being shown in place therein, one disk being partly broken away to disclose the surface of the disk behind it. Fig. 3 is a side elevation of one of the disks of my improved device in a form somewhat modified from that shown in Fig. 2. Fig. 4 is an axial section at the line 4 4 on Fig. 1, showing the form of plates illustrated in Fig. 2. Fig. 5 is a similar section showing one of the plates in the form illustrated in Fig. 3 and the pins in a different form from that shown in Fig. 4. Fig. 6 is a detail side elevation of a fragment of one of the slotted disks for the teeth of the form required by the structure shown in Fig. 5. Fig. 7 is a detail elevation of a further slightly-modified form of tooth adapted for use with either of the forms of retaining-plate shown in Fig. 2 or Fig. 3. Fig. 8 is a detail section at the line 8 8 on Fig. 1.

As is well understood, the process of seeding raisins and similar fruit which has been most commonly employed involves passing the fruit between two parts, usually two rollers, one of which is made of rubber or provided with a thick covering of rubber and the other being armed with a multiplicity of teeth set so closely together as practically to insure the encounter of one or more teeth with every seed of the fruit when the latter passes between two rollers rolling together, the result being that the teeth perforate the fruit and force the seeds out therefrom into the rubber, which yields to receive the seed and tooth, the flesh of the fruit being forced by the rubber back on the teeth and flattened on the surface of the roller at the base of the teeth, so that it adheres thereto or at least is retained thereon by the teeth penetrating it, the seeds being ejected from the rubber by the resiliency of the latter after passing the toothed cylinder and the fruit being stripped from the toothed cylinder by suitable stripping devices. Great difficulty has been experienced heretofore in producing the toothed cylinders for this purpose in such manner or with such details of construction as to provide teeth which, first, shall be so that they will not tear the fruit or retain and force out with the seed an undue proportion of the flesh, and which, secondly, shall be so uniform in their arrangement on the cylinder as to cooperate accurately and reliably with the strippers, and which, thirdly, shall not be either too liable to be broken or bent in use or too difficult to replace when thus injured.

My invention consists in providing a toothed roller of which the teeth are individually detachable and in which therefore repairs can be made tooth by tooth.

I have represented only so much of the general structure of the machine as is necessary to indicate the relation of the parts involving my invention.

A is one side of the cheek-piece of the frame of my raisin-seeding machine, of which B is the rubber roll, and C the toothed roll. It will be understood that suitable mechanism exists for causing the two rollers to revolve at the same speed and in opposite directions about their respective axes, so as to cause their coöperation in the manner already above indicated in general terms. The "toothed roll" or "perforating-cylinder" (the two terms being herein used as synonymous) in my improved machine consists of a multiplicity of thin metal disks mounted on a common shaft or arbor. Alternate disks D D, &c., are radially slotted for a short distance from their outer periphery, the slots $d$ $d'$ $d^2$ being in groups of two, three, or more, the first of each group being shortest and the succeeding slots of the group being successively longer and longer, so that the slots terminate in two or more concentric circles. As illustrated they are shown in groups of three, terminating in three such circles. The reason of this specific construction will be hereinafter stated. The other alternate disks E E E, &c., are shown in two forms. In the form illustrated in Figs. 2 and 4 these disks E are provided with apertures $e'$, $e$, and $e^2$ in groups of three, as indicated, corresponding in position to the ends of the slots $d$ $d'$ $d^2$. F F F, &c., are the teeth or seed-expelling pins, which are employed in the structure shown in Fig. 2. They are made of wire, with smoothly-rounded points and angle-heads $F'$. Their diameter is substantially the thickness of the disks D, which is also the width of the slots $d$, $d'$, and $d^2$, and the length of the offset or angle heads $F'$ is substantially equal to the thickness of the alternate disks E E E. These pins are made of three lengths, corresponding to the lengths of the slots $d$, $d'$, and $d^2$, the shortest lengths being designed to be lodged in the shortest slots and the other lengths to be lodged in the corresponding slots, the offset or angle-heads being thereby adapted to enter the holes $e$ $e'$ $e^2$ in the plates E. A suitable number of these disks being assembled on the shaft to constitute a cylinder of proper length they are bound together by bolts G G G G, extending through all the disks inside the innermost circle of holes $e^2$ and inner ends of the longest slots $d^2$. The disks are also designed to be bound on the shaft in the same manner as an assemblage of saws might be bound on a common arbor. No specific illustration of the mode of thus clamping the disks together is deemed necessary. The one purpose of making the pins and the slots to receive them in a plurality of series of different lengths is that otherwise—that is, if they were all of the same length—the holes necessary to receive their heads, being all in one circle, would practically cut off the disk at that circle, because it is necessary that the pins should stand so close together that a seed cannot ordinarily enter between them, and they may be separated by even less than the diameter of the pins. In the form shown in Figs. 3, 5, and 6 the teeth consist of pins $F^a$, which have a struck-up knob or globular head instead of the angle-head $F'$ of the pins F. This form of head necessitates lateral enlargement of the radial slots at the inner end, as shown at $d^a$ in Fig. 6. When teeth of this form are employed, I prefer to secure them by means of grooves $e^a$ in the faces of the adjacent disks E E E, such grooves being concentric and corresponding to the several series of pins—that is, the different lengths of pins employed. The heads $F^{a'}$ need but slight engagement in the disks E in order to retain them, because they are engaged at both sides, and the grooves therefore need not be in depth more than one-third the thickness of the disks E, so that although both faces of the disks are thus grooved, corresponding grooves being opposite, there still remains one-third the thickness of the disk for strength, which is adequate. The disks of this form are bound together in the same manner as those of the other form—to wit, by the bolts G on the shaft or arbor.

The angle-headed pins F obviously may be employed in connection with the annularly-grooved disks shown in Fig. 3 by making the angle-heads only equal to the depth of the grooves, and for greater security there may be employed, in connection with the disks D of the form shown in Fig. 2 and the disks E of the form shown in Fig. 3, teeth $F^b$, with a cross-head, rendering them of T form, as shown in Fig. 7.

For the purpose of stripping the fruit from the toothed cylinder I provide a stripping device comprising a multiplicity of blades H H H, &c., adapted to enter between the circumferential rows of teeth on the cylinder and bear on the surface of the cylinder—that is, on the periphery of the intervening disks E E E, &c. The blades H H H are mounted on a shaft $H'$, whose axis is preferably in a plane substantially tangential to the cylinder at the line of bearing thereon of the points of the stripping-blades. The shaft $H'$ is mounted in the frame at fixed position with respect to the toothed cylinder, and the blades may either be individually free to oscillate on the shaft or the shaft may be free to turn or rock in its bearings, or both provisions may be made, to permit the blades at their points to bear without restraint on the periphery of the cylinder to insure thoroughly cleaning the fruit therefrom while stripping it from the teeth. In order to hold the blades thus in contact with the cylinder at the points, I provide them with tails or outward extensions $H^2$ $H^2$ in the form of a hook or upwardly open seat, in which may be lodged a weight-bar J, which either by its own weight or by a weight attached to it shall be adequate to hold the blades to their work. If it should be found desirable to apply the pressure otherwise than by weight, the necessary change will be obvious to any mechanic, and if it should be deemed desirable in any case to apply to the blades individually the necessary pressure to hold them to their work on the cylinder it will be evident that the tail extensions $H^2$ afford facility for so doing, and it will be obvious to any mechanic in what manner this may be done. The most convenient construction for spacing the blades so that their points shall register with the spaces between the rows of teeth on the cylinder is to arrange them on the shaft, alternating with spacing-washers $H^4$ $H^4$, &c. The entire assemblage of blades and washers will of course require to be retained in longitudinal position on the shaft by suitable stop-collars, one of which, $H^5$, is shown in Fig. 8. If it is preferred in any case to make the blades rigid with the shaft, these stop-collars may be set up firmly enough to bind the entire assemblage rigidly.

I claim—

1. In a raisin-seeding or similar machine, a toothed cylinder composed of a plurality of disks arranged side by side on a common shaft, said disks being of two sorts alternating with each other, those of one sort having radial slots and headed pins lodged therein and protruding beyond the periphery, those of the other sort having recesses in position to receive the heads of the pins, and suitable means for binding the disks longitudinally of the cylinder to retain them in lateral contact successively.

2. In a raisin-seeding or similar machine, a toothed cylinder composed of a plurality of disks arranged side by side on a common shaft, said disks being of two sorts alternating with each other, those of one sort having radial slots and headed pins lodged in the slots and protruding beyond the periphery, those of the other sort having annular recesses in position to receive the heads of the pins, and suitable means for binding the disks longitudinally to retain them in lateral contact successively.

3. In a raisin-seeding or similar machine, a toothed cylinder composed of a plurality of disks arranged side by side on a common shaft, said disks being of two sorts alternating with each other, those of one sort having radial slots in two or more series distinguished by the length of the slots, no two consecutive slots being of the same series, headed pins lodged in said slots respectively with their points protruding beyond the periphery of the disks, the disks of the other sort having recesses in position to receive the heads of the pins, respectively.

4. In a raisin-seeding or similar machine, a toothed cylinder composed of a plurality of disks arranged side by side on a common shaft, said disks being of two sorts alternating with each other, those of one sort having radial slots in two or more series distinguished by the length of the slots, no two consecutive slots being of the same series, headed pins lodged in said slots with their heads at the inner ends of the slots and their points protruding beyond the periphery of the disks, the disks of the other sort having consecutive annular recesses in positions corresponding to the heads of the pins of the several series, respectively.

5. In a raisin-seeding or similar machine, in combination with a toothed cylinder comprising a multiplicity of thin disks of equal diameter and a shaft on which they are coaxially mounted, and seed-expelling teeth consisting of pins inserted in and projecting from the peripheries of alternate disks; stripping-blades adapted to enter between the circumferential rows of teeth and to bear upon the alternating disks between them; a shaft parallel to the cylinder-shaft, on which such stripping-blades are mounted and free to oscillate, said blades having tails which extend beyond the shaft, and a bar engaging all said tails and affording means for applying pressure thereto to hold their points seated on the peripheries of said alternate disks.

6. In a raisin-seeding or similar machine, in combination with the cylinder having seed-expelling teeth in parallel circumferential rows, stripping-blades entering between the rows of teeth and bearing upon the cylinder; a shaft on which such blades are mounted and on or with which they are adapted to turn, such blades being provided with an extension or tail in the form of a hook or upwardly open seat and a weight-bar lodged in such hook or seat to hold the points of the teeth on the cylinder.

In testimony whereof I have hereunto set my hand, in the presence of two witnesses, at Chicago, this 2d day of December, 1898.

CHARLES N. HOLDEN.

Witnesses:
CHAS. S. BURTON,
BERTHA C. SIMS.